(12) United States Patent
Weber et al.

(10) Patent No.: US 7,607,194 B2
(45) Date of Patent: Oct. 27, 2009

(54) DEVICE FOR DETACHABLY LINKING A WIPER BLADE WITH A WIPER ARM

(75) Inventors: Matthias Weber, Baden-Baden (DE); Harald Rapp, Buehl (DE); Godelieve Kraemer, Huegelsheim (DE); Juergen Mayer, Gaggenau (DE); Wolfgang Leutsch, Buehlertal (DE); Michel Baseotto, Hasselt (BE); Dirk Herinckx, Linter (BE); Peter De Block, Halen (BE); Hubert Verelst, Tienen (BE); Philippe Holsbeekx, Wygmool (BE); Frans Breesch, Borgloon (BE); Eric Windmolders, Kermt (BE); Christian Wilms, Beringen-Koersel (BE); Inigo Op't Roodt, Hasselt (BE); Hans Beelen, Herk-de-Stad (BE); Robert Vertongen, Heusden-Zolder (BE); Johnny Geling, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 886 days.

(21) Appl. No.: 10/250,389

(22) PCT Filed: Nov. 16, 2001

(86) PCT No.: PCT/DE01/04272
§ 371 (c)(1),
(2), (4) Date: Jun. 1, 2004

(87) PCT Pub. No.: WO02/053421
PCT Pub. Date: Jul. 11, 2002

(65) Prior Publication Data
US 2004/0211021 A1 Oct. 28, 2004

(30) Foreign Application Priority Data
Dec. 28, 2000 (DE) .................................. 100 65 124

(51) Int. Cl.
*B60S 1/40* (2006.01)
*B60S 1/34* (2006.01)
(52) U.S. Cl. ...................... 15/250.32; 15/250.351; 15/250.43

(58) Field of Classification Search ............. 15/250.32, 15/250.201, 250.43, 250.44, 250.361, 250.33, 15/250.351
See application file for complete search history.

(56) References Cited

U.S. PATENT DOCUMENTS 1,779,344 A * 10/1930 Tarver ..................... 15/250.33

(Continued)

FOREIGN PATENT DOCUMENTS

DE 0 077 087 3/1960

(Continued)

*Primary Examiner*—Gary K Graham
(74) *Attorney, Agent, or Firm*—Michael Best & Friedrich LLP (57) ABSTRACT

A device is proposed which is used to detachably connect a wiper blade (12) to clean windows, particularly of motor vehicles, to a driven wiper arm (10) featuring a wiper blade holder (50 or 150), whereby the wiper blade (12) that can be placed on the window (20) with a long-stretched-out, rubber elastic wiper strip (18) features a band-like, long-stretched-out elastic supporting element (16) that is curved in the longitudinal direction over its band surfaces (15, 17) on whose lower, concave band surface (17) the wiper strip (18) is arranged parallel to the longitudinal axis. On the outer convex band surface (15) of the supporting element (16) sits a connecting element (26), which features two parallel wall surfaces (36) that are aligned in a vertical plane on the band surface and extend in the longitudinal direction of the wiper blade and that a pivot pin (42) projects from each wall surface, whereby the longitudinal axes of the two pivot pins are aligned with one another. An especially simple embodiment of the articulated connection with an integrated connecting device is achieved if an adapter (66 or 166) that can move in a pendulum fashion is positioned on the two pivot pins of the connecting element (26), and said adapter features means to connect to the wiper blade holder (50 or 150) of the wiper arm (10).

19 Claims, 5 Drawing Sheets

U.S. PATENT DOCUMENTS

| | | | |
|---|---|---|---|
| 2,176,373 A | | 10/1939 | Lillian et al. |
| 3,056,160 A | * | 10/1962 | Oishei et al. .............. 15/250.32 |
| 3,133,304 A | * | 5/1964 | Reese ....................... 15/250.32 |
| 3,192,551 A | * | 7/1965 | Appel ...................... 15/250.43 |
| 3,431,579 A | | 3/1969 | Krohm et al. |
| 3,785,002 A | * | 1/1974 | Quinlan et al. ........... 15/250.43 |
| 4,120,069 A | * | 10/1978 | Sharp et al. ............... 15/250.32 |
| 6,434,780 B1 | * | 8/2002 | Kotlarski ................. 15/250.32 |

FOREIGN PATENT DOCUMENTS

| | | | |
|---|---|---|---|
| DE | 10 77 087 | | 3/1960 |
| DE | 1 505 257 | | 6/1969 |
| DE | 19641042 A1 | | 4/1998 |
| JP | 09-048328 | | 2/1997 |
| WO | WO99/02380 | | 1/1999 |
| WO | WO99/02383 | | 1/1999 |
| WO | WO 00/07857 | | 2/2000 |
| WO | 00/12360 | * | 3/2000 |
| WO | 00/38962 | * | 7/2000 |
| WO | WO 00/38964 | | 7/2000 |

* cited by examiner

DEVICE FOR DETACHABLY LINKING A WIPER BLADE WITH A WIPER ARM

STATE OF THE ART

The invention concerns a connecting device in accordance species of the independent patent claim. In the case of the addressed wiper blade, the supporting element is supposed to guarantee the most uniform possible distribution of wiper blade application force on the window originating from the wiper arm for the entire wiper field being covered by the wiper blade. Due to the corresponding curvature of the relaxed supporting element—i.e., when the wiper blade is not adjacent to the window—the ends of the wiper strip that are placed completely against the window during wiper blade operation are loaded by the supporting element that is stressed vis-à-vis the window even when the radii of curvature of spherically curved vehicle windows change with every wiper blade position. As a result, the curvature of the wiper blade must be somewhat greater than the greatest curvature measured in the wiper field on the to-be-wiped window. The supporting element thereby replaces the expensive supporting bracket design that has two spring rails arranged in the wiper strip for transverse reinforcement of the rubber elastic wiper strip, as is the practice with conventional wiper blades (DE 1505 257 A1). A wiper blade with such a supporting element is supposed to be captively attached to the wiper arm in a simple manner and be able to be removed from it again.

In order to connect a wiper blade embodied in this manner to the wiper arm, the wiper blade must be provided with a specially embodied connecting element, which can be used to connect it in the required manner to the wiper arm. In addition, the wall surfaces of the connecting element should provide proper guidance for the wiper blade, when it is slid from the wiper arm transverse to its longitudinal extension over the to-be-wiped window, because they are adjacent to the wiper arm's guidance surfaces. Because the normally spherically curved windshield of a motor vehicle does not represent a section of a spherical surface, the wiper blade must be able to constantly adapt to the respective position and progression of the window surface vis-à-vis the wiper arm during its wiper operation. For this reason, a smooth-running articulated connection between the wiper arm and the wiper blade that enables an oscillation motion around the pivot pin axis is required.

The invention starts with a connecting device. With a known device of this type (DE 19 72 9862.1A1), the two pivot pins are each provided with two opposing surfaces on their lateral surfaces. This makes it possible to the put the wiper blade with this pin in place in the wiper arm's rest recess, which recesses have open edges via the insertion channels that are coordinated with the distance of the pin surface from one another. To connect the wiper blade to the wiper arm or to detach the wiper blade from the wiper arm, however, the wiper blade must be turned around the pivot pin axis in a position transverse to the wiper arm extension so that the pins can be brought through the insertion channels into their rest recesses and the mounted wiper blade can be held in its operating position against the window in a captive manner on the wiper arm. To do this, however, the wiper arm must be folded away from the window. However, in many application cases, it is not possible to fold the wiper arm like this, because the wiper arm in its resting position on the window edge that facilitates the assembly process is under the covering of the vehicle body, for example, or because the arrangement of the folding joint is supposed to be dispensed with for cost reasons.

ADVANTAGES OF THE INVENTION

In the case of the connecting device the adapter featuring the connecting means on the wiper-blade side must first be connected to the wiper blade so that it is a part of the wiper blade. The embodiment of a special joint between the wiper arm and the wiper blade is thereby eliminated and the functions of the articulated connection and the connecting means are separated from one another and therefore can be optimized without compromise. To develop the holding connection between the wiper blade and the wiper arm, it is only necessary for holding and/or locking means arranged on the adapter to be engaged with corresponding counter holding means or counter locking means of the wiper arm. Its embodiment can take place, for example, in such a way that the connection between the wiper arm and the wiper blade is achieved by a sliding movement of the wiper blade in the longitudinal direction of the wiper arm, whereby the wiper arm does not have to be lifted from the window or only very negligibly.

A particularly small design of the articulated connection between the wiper arm and wiper blade and one where the connecting device does not impair vision from the passenger compartment of the motor vehicle is produced if the distance between the two wall surfaces of the connecting element is smaller than the width of the supporting element.

Thus, in accordance with a design of the invention that is particularly suited for manufacturing, the two wall surfaces of the connecting element are formed by the outside surfaces on the T-foot of a component whose cross-section is T-shaped at least in sections, and whose T-head facing the supporting element is connected to it.

This type of connection can be achieved cost effectively by the connecting element being provided with claw-like extensions on the longitudinal edges of the T-head facing away from each other, which grip around the outer longitudinal edges of the supporting element.

Additional advantages related to manufacturing can be achieved by the connecting element, when seen in cross-section, having two essentially rectangular halves, which form the T-foot with an adjacent angle leg and whose other angle legs together form the T-head.

In this connection, it is expedient if the two metal halves on the T-foot are connected with one another as a single piece.

In the case of special application cases, it can be advantageous for cost reasons if the connecting element is fabricated of a plastic, because then the pivot pins can be formed directly on the connecting element.

In another development of the invention where the adapter essentially has a U-shaped cross-section, whose two U-legs grip over the T-foot of the connecting element laterally so they fit, whose U-base covers the T-foot of the connecting element and in each of the two U-legs an open-edge, slot-like recess is arranged towards their free ends, whose slot ends form rest receptacles for the pivot pins, large guidance surfaces are produced between the adapter that belongs to the wiper blade and the connecting element connected to the supporting element of the wiper blade, thereby achieving a connection free of play that assures a good wiper image.

Securing the adapter on the articulated bolt of the connecting element even if the wiper arm is lifted up from the window is produced by the adapter being fabricated of an elastic plastic and by the slot-like recesses having elastically expandable narrowings, limiting the rest receptacle.

In order to improve the articulated support guidance, the adapter is provided with collar-like projections surrounding the rest receptacles on the outer sides of its U-legs facing away from each other.

With the intention of a particularly small articulated connection free of play, the wiper blade holder of the wiper arm grips over the adapter on its U-legs with side cheeks so that it fits, whereby open-edge recesses are arranged in the side cheeks for the collar-like projections of the adapter.

So that the wiper blade cannot be detached unintentionally from the wiper arm or wiper blade, the recesses features an L-shaped form, whereby the one L-leg has an open edge towards the supporting element of the wiper blade and the other L-leg extends towards the free end of the wiper arm, whereby the width of the recesses is coordinated with the outside diameter of the collar-like projections of the adapter.

For the purpose of a final operationally reliable locking of the wiper blade on the wiper arm, the adapter is provided with a tongue that is elastically deflectable against a restoring force, on which a locking shoulder is embodied, which is aligned transverse to the wiper blade and in a vertical plane on the supporting element, whereby the locking shoulder is assigned a wiper-arm-mounted counter locking shoulder and whereby the locking shoulder cooperates with the counter locking shoulder when the collar-like projections of the adapter are adjacent to the closed ends of the other L-legs of the recesses in the side cheeks of the wiper blade holder.

An unintentional activation of the tongue in the sense of detaching the safety connection between the wiper blade and the wiper arm is avoided if the tongue is connected with at least one U-leg of the adapter on its side facing the drive side of the wiper arm and, in addition, if the locking shoulder projects on the side of the tongue facing away from the wiper blade and said locking shoulder is assigned a wiper-arm-mounted counter locking shoulder.

On the other hand, a user friendly embodiment of the invention is produced if the tongue is arranged on the U-base of the adapter and extends towards the free end of the wiper arm, whereby the counter locking shoulder is embodied on the front side of the wiper arm and the tongue projects over the free end of the wiper arm with its locking shoulder.

In order to prevent a disadvantageous relative rocking movement around the articulated axis between the wiper arm and the adapter, it has proven to be expedient if the adapter is provided with a lateral overhang at least on one U-leg at a distance from the collar-like projections, and said overhang is assigned to a recess provided on the side cheeks of the wiper blade holder.

To protect the articulated connection from dirt, shield-like coverings projecting laterally over the projections are arranged on the collar-like projections at a distance from the U-legs of the adapter.

The foregoing explanations therefore yield an entire series of features, which contribute to the construction of an articulated connection between the wiper arm and wiper blade that is easy to operate, cost-effective and free of play. One of the components that is required for this—is a connecting element—. A known connecting element of this type (DE 19 72 98 64.8A1) features an articulated bolt on only one side of the T-foot for connecting to the wiper arm. This therefore results in an articulated connection placed outside the longitudinal middle axis of the wiper blade, which can prove to be disadvantageous with respect to the application force originating from the wiper arm in the case of certain window configurations. In this case, the two wall surfaces of the T-foot that face away from one another also do not serve as guidance surfaces, which cooperate with corresponding counter surfaces of the wiper arm during wiper operation. In this case, wiper blade guidance is assumed alone by the small-surface, one-sided ring collar of the articulated bolt. However, if the structural element is appropriately developed, the application force originating from the wiper arm will be transmitted uniformly on both pins and excellent wiper blade guidance will also be achieved during wiper operation Additional advantageous further developments and designs of the invention are disclosed in the following description of the exemplary embodiments depicted in the associated drawing.

DESCRIPTION OF THE EXEMPLARY EMBODIMENTS

Figure 1:
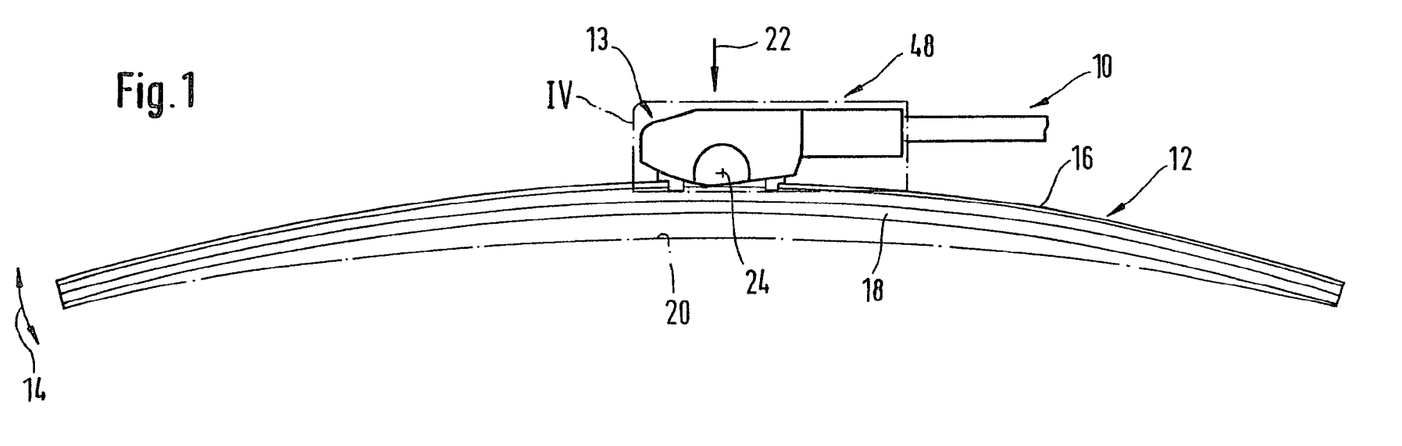
FIG. 1—A side view of a wiper blade linked to the free end of a wiper arm.

FIG. 1 shows a side view of the free end of a wiper arm 10 driven from its other end (not shown), to which a wiper blade 12 is linked via an articulated connection 13 in such a way that it can oscillate in the direction of the double arrow 14. The wiper blade has a band-like, long-stretched-out, elastic supporting element 16 that is curved over its band surfaces, on whose lower concave band surface 17 facing the window 20 a likewise band-like, long-stretched-out, rubber elastic wiper strip 18 is arranged parallel to the longitudinal axis. The to-be-wiped surface of the motor vehicle window is indicated in FIG. 1 by a dash-dotted line 20. Since line 20 is supposed to represent the greatest curvature of the window surface, it is clearly evident that the curvature of the still relaxed wiper blade 12, which is adjacent to the window 20 at its two ends, is greater than the maximum window curvature. Under an application force that acts via the wiper arm 10 in the direction of arrow 22, the wiper blade applies its wiper strip 18 over its entire length to the window surface 20. In doing so, tension builds up in the supporting element 16 fabricated of metal and this tension is responsible for proper application of the wiper strip 18 over its entire length on the window as well as for a uniform distribution of the application force (arrow 22).

Because the normally spherically curved window does not represent a section of a spherical surface, the wiper blade 12 must be able to constantly adapt to the respective position and progression of the window surface vis-à-vis the wiper arm 10 during its wiper operation. For this reason, a smooth-running articulated connection between the wiper arm and the wiper blade that enables an oscillation motion (double arrow 14) around the articulation axis 24 is required. The arrangement of the articulation axis or oscillation axis is made in this regard so that it is aligned transverse to the longitudinal extension of the wiper arm 10 and transverse to the direction of the application force (arrow 22). Two exemplary embodiments of this type of articulated connection are supposed to be explained in greater detail in the following on the basis of FIGS. 4 through 9 and 10 through 13.

Figure 2:
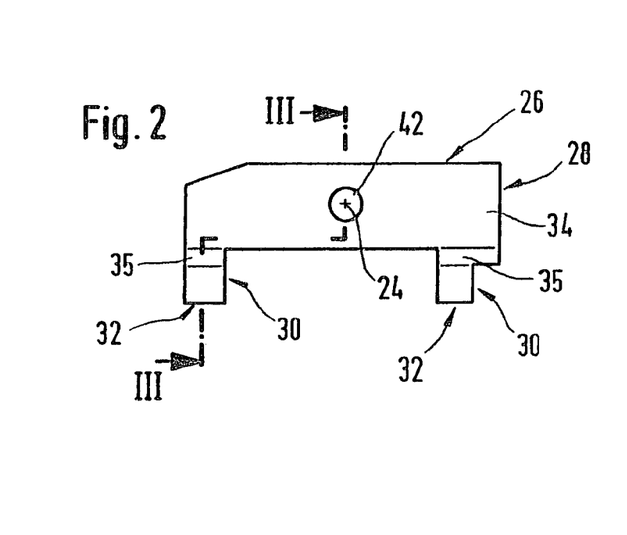
FIG. 2—A side view of a connecting element that can be solidly connected with the wiper arm.
Figure 3:
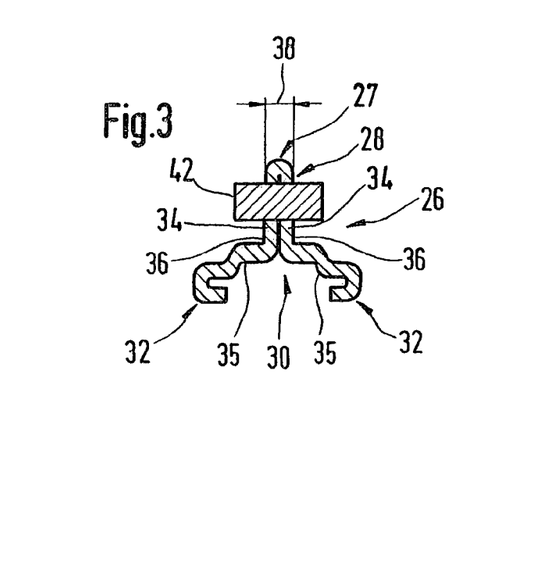
FIG. 3—A section along line III-III through the connecting element according to FIG. 2.

A connecting element 26 (FIGS. 2 and 3) that essentially has a T-shaped cross-section also belongs to the wiper blade. It has, therefore, a T-foot 28 and a T-head 30, whose longitudinal extension is limited however to two comparably short sections lying at a distance from one another. Claw-like projections 32 are arranged on the longitudinal edges of the T-head 30 facing away from each other, whose function will be discussed in more detail later. As can be seen in FIG. 3 in particular, the T-shape of the connecting element 26 is produced in the exemplary embodiment by a sheet metal part being folded in such a way that the T-foot 28 is formed by two adjacent sheet metal sections 34, which in their further progression, change into the bent T-head parts 32. This results in two symmetrically arranged halves, which are connected with one another as a single piece by the fold at the T-foot 28. These two adjacent essentially rectangular halves of the connecting element 26 thus form the T-foot 28 with their one angle leg 34 and the other angle legs 35 together produce the T-head 30. The two outer surfaces 36 of the T-foot 28 facing away from each other lie at a distance 38 from each other that is smaller than the width 46 (FIG. 4) of the supporting element 16. The T-foot 28 of the connecting element 26 penetrated in a bore hole 27 in its longitudinal middle section by an articulated bolt 42, which is permanently connected with the connecting element and whose two ends project out of the T-foot 28 on both sides (FIG. 3). It is also conceivable, however, to replace the articulated bolt or its two ends projecting out of the walls or the outside surfaces 36 of the angle leg 34 or pivot pins 43 with two separate, short pins, which for their part can be formed by numerous and varied methods known to the expert, e.g., the arrangement of supports, embossing marks, extrusion pegs, etc.

Figures 4, 5, 6:
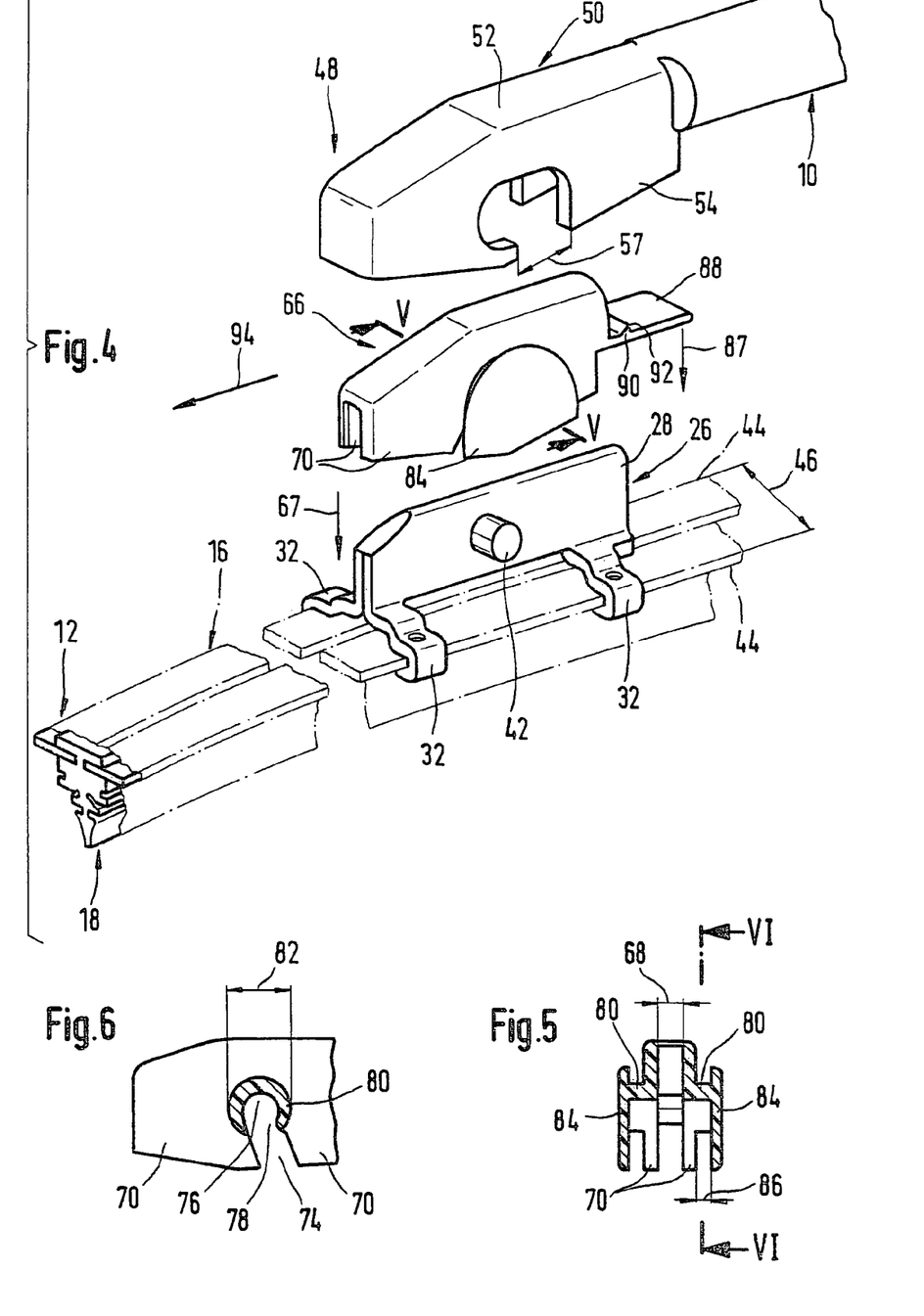
FIG. 4—An exploded representation of the individual elements belonging to a first embodiment of the connecting device.
FIG. 5—A cross-section along line V-V in FIG. 4 through the one individual element serving as adapter.
FIG. 6—A section along line VI-VI through the arrangement according to FIG. 5.
Figure 7:
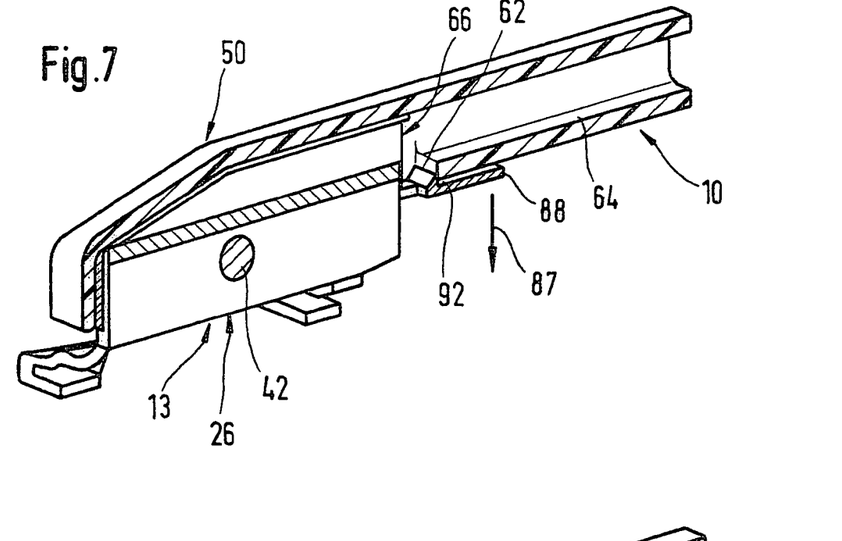
FIG. 7—A longitudinal section through the structural elements according to FIG. 4 that are joined together for the articulated connection.

The first embodiment of the articulated connection between the wiper arm 10 and the wiper blade 12 is depicted in FIG. 4 in an exploded representation. In this regard, the representation is limited to the areas of the wiper blade 12 that are necessary to understand the articulated connection 13. This figure also makes evident how the connecting element 26 is connected to the supporting element 16 of the wiper blade 12. The wiper blade has, as a supporting element, two parallel spring rails 44 that are positioned in the wiper strip's 18 longitudinal grooves, curved over their band surfaces in the longitudinal direction and which project out of the longitudinal grooves at least in the longitudinal middle section with outer edge strips. The connecting element 26 placed here encompasses, from the outer convex band surface 15 of the supporting element 16 with its claw-like projections 32, the outer edge strips 45 of the spring rails 44 facing away from one another and projecting out of the longitudinal grooves, whereby a clamping force originating from the claws 32 and/or weld joints is responsible for a non-detachable connection between the spring rails 44 and the connecting element 26. Additional fastening methods are well-known to the expert. This connecting element 26 is thus a part of the wiper blade 12. When examining the wiper blade 12 in FIG. 4 it is also clear that the distance 38 between the two outer wall surfaces 36 (FIG. 3) is smaller than the width 46 of the supporting element 16.

Figure 8:
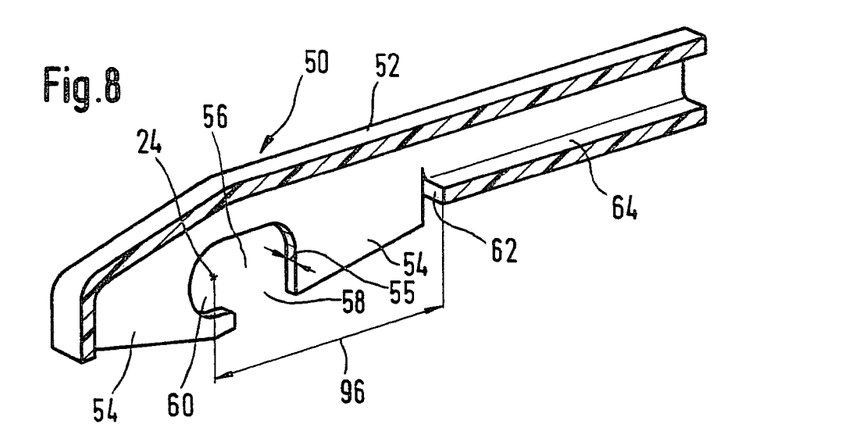
FIG. 8—A longitudinal section of another structural element according to FIG. 4 serving as wiper blade holder.
Figure 9:
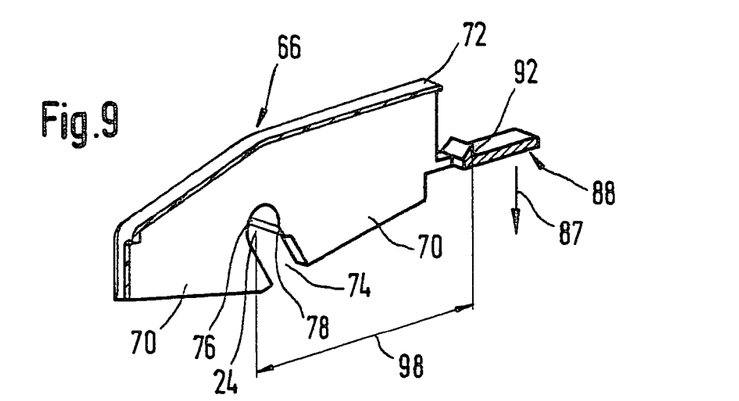
FIG. 9—A longitudinal section through the structural element according to FIG. 4 serving as the adapter.

The wiper arm 10 is provided with a wiper blade holder 50 on its free end 48 facing away from its driven side (FIG. 1). The longitudinal section through the wiper blade holder depicted in FIG. 8 and the simultaneously examination of the wiper blade holder according to FIG. 4 show that it has a U-shaped cross-section. Therefore, it has a U-base 52 in this area and two U-legs or cheeks 54 arranged at a distance from and parallel to one another, in each of which a recess 56 with a L-shaped form is arranged. The one L-leg 58 of the recess 56 has an open edge towards the supporting element 16 (FIG. 4), while the other L-leg 60 extends towards the free end of the wiper arm 10 or the wiper blade holder 50. On the side of the recess 56 facing away from the free end of the wiper blade holder 50, a stop shoulder 62 extends at a distance from this recess into the space of the wiper blade holder 50 remaining between the cheeks 54 (FIG. 8). The stop shoulder 62 is embodied on the end of a bent continuation 64 of the U-leg 54 that is directed inward, and points to the free end of the wiper blade. It is clearly evident in connection with FIG. 4 that a longitudinal half of the wiper blade holder 50 is depicted in FIG. 8. Since the plane of the longitudinal section represents a plane of symmetry, it is also clear that the other longitudinal half of the wiper blade holder 50 that is not shown is embodied in a mirror image of FIG. 8.

FIGS. 4 through 6 and 9 show the structure of an adapter 66, which makes possible the articulated connection of the wiper blade 12 to its connecting element 26 on the wiper blade holder 50 of the wiper arm 10. When examining FIG. 9 it should be noted that the longitudinal section also lies in a plane of symmetry so that the other longitudinal half that is missing (but depicted in FIGS. 4 and 5) has an embodiment that is a mirror image corresponding to FIG. 9. In addition, the figures mentioned show the U-shaped structure of the adapter 66. The distance 68 (FIG. 5) between its two U-legs 70 is selected in such a way that smooth-running guidance of the adapter that is free of play to the T-foot 28 of the connecting element 26 is produced if it is put in its working position. In this working position, the U-base 72 covers the T-foot 28 of the connecting element 26. Arranged in each of the two U-legs 70 of the adapter 66 are slot-like recesses 74 that are congruent with one another and have an open edge towards the free end of the U-leg, whereby rest receptacles 76 for the articulated bolts 42 of the connecting element 26 are embodied on the ends of the slots. In order to guarantee an operationally reliable hold of the adapter 66 on the articulated bolt 42, the slot-like recesses 74 have elastically expandable narrowings 78 in the area of the rest receptacles 76. The slot-like recesses 74 form insertion channels, via which the pin-like articulated bolts 42 can be placed in their rest receptacles 76. The expandability of the narrowings 78 is achieved in the exemplary embodiment by the fact that the adapter 66 is fabricated of an elastic plastic. As FIGS. 5 and 6 in particular show, collar-like projections 80 are arranged on the outer sides of the U-legs 70 of the adapter 66 facing away from each other, which collar-like projections encircle the rest receptacles in a ring-like manner over at least 180° (FIG. 6). The diameter 82 of the collar-like projections 80 is coordinated with the width 57 of the recess 56. Arranged on the free ends of the collar-like projections 80 are shield-like coverings 84 projecting laterally beyond the projections 80, as is particularly evident in FIGS. 4 and 5. The distance 86 between the outer sides of the U-legs 70 and the inner walls of the coverings 84 facing them is coordinated with the thickness 55 (FIG. 8) of the cheeks 54 of the wiper blade holder 50. On its end facing the drive-side end of the wiper arm 10, the adapter 66 is connected as a single piece with a blade-like tongue 88 that is elastically deflectable against a restoring force, whose blade surfaces are approximately parallel to the plane of the supporting element 16. On the blade surface facing the U-base 72 of the adapter 66, the tongue 88 features a tooth-like overhang 90 on whose side facing away from the adapter body a locking shoulder 92 is embodied. The locking shoulder 92 extends transverse to the wiper blade 12 and in a vertical plane on the supporting element 16.

To prepare to connect the wiper blade 12 to the wiper arm 10, the adapter 66 is first placed on the structural element 26. To do so, the adapter 66 is put on the T-foot 28 of the structural element 26 in the direction of arrow 67, whereby the pin-like articulated bolts 42 reach their rest receptacles 76 via the slot-like recesses 74 (FIG. 6) after passing through the narrowing 78. In this assembly position, the adapter 66 is able to oscillate around the articulated axis 24 formed by the articulated bolts 42 in the direction of the double arrow 14 (FIG. 1) by the angular measurement required to guarantee the wiper blade's wiper operation. The adapter 66 now forms a part of the wiper blade 12. For connection to the wiper arm 10, the wiper blade along with its adapter 66 is moved against arrow 67 (FIG. 4) towards the wiper blade holder 50 in such a way that the adapter 66 reaches between the U-legs or cheeks 54 of the wiper blade holder 50. In this process, the collar-like projections 80 enter the recess 56 of the wiper blade holder 50, whereby the cheeks 54 dip between the U-legs 70 of the adapter 66 and the shield-like coverings 84 of the projections 80. When the L-shaped form of the recess 76 limits this assembly movement directed against arrow 67, the wiper blade is pulled in the direction of arrow 94 (FIG. 4) to the free end 48 of the wiper blade holder 50 until the collar-like projections 80 are adjacent to the closed end of the other L-leg 60 of the recess 56. In the final or working position of the wiper blade 12 on the wiper arm 10 that is now achieved, the tongue 88 that deflected towards the supporting element 16 of the wiper blade 12 via the continuation 64 during the assembly process in the direction of arrow 87 springs back into its initial position, whereby the locking shoulder 92 embodied on the overhang 90 cooperates with the stop shoulder 62 on the continuation 64. The tongue 88 is thereby protected beneath the wiper arm 10. In order to guarantee a proper working position of the wiper blade 12 on the wiper arm 10 that is free of play, it is necessary to carefully coordinate the distance 96 between the articulated axis 24 and the stop shoulder 62 on the continuation 64 of the wiper arm with the distance 98 between the articulated axis 24 and the locking shoulder 92 of the adapter 66. If the wiper blade is supposed to be detached from the wiper arm, the tongue 88 only has to be deflected far enough in the direction of arrow 87 for the locking shoulder 92 to release the stop shoulder 62. After that the wiper blade can first be slid against the direction of arrow 94 and then be removed from the wiper arm 10 in the direction of arrow 67.

In the case of the other embodiment of the invention depicted in FIGS. 10 through 13, both the structure of the wiper arm 110 or its wiper blade holder and the structure of the adapter 166 essentially correspond to the structure of the wiper blade holder 50 or of the adapter 66 in the first embodiment described above. For this reason, all developments that were already described there and adopted unmodified are designated by a reference number that is larger by 100 than the reference numbers use in the first embodiment. In addition, the description of the second exemplary embodiment of the invention is restricted essentially to details where the second embodiment deviates from the first embodiment already described.

Thus, the wiper arm 110 has an opening 200 (FIG. 10) on the transverse wall 111 on its free end, through which the U-base 152 and the partial areas of the U-legs or cheeks 154 terminate with a forepart 162 and the forepart 162 of the U-base forms a stop shoulder on the wiper-arm side. This stop shoulder 162 takes the place of the stop shoulder 62 according to the first embodiment. In addition, recesses 156 are arranged in the U-legs 154 of the wiper blade holder 150 and these recesses also have a L-shaped configuration and thus each feature two L-legs 158 and 160. On the side facing away from the forepart 162, the wiper blade holder 150 has a open-edged slot 202 in each of its U-legs 154, which slot extends in the longitudinal direction of the wiper arm and thus also in the direction of the other L-leg 160. The opening of the slots 202 faces away from the forepart 162. Instead of the tongue 88 in the case of the first embodiment, in the case of the adapter 166, a tongue 204 that is elastically deflectable against a restoring force is arranged on the end of the adapter 166, which, after the wiper blade 12 is successfully assembled with the wiper arm, lies in the area of the free end of the wiper arm 110. It is arranged as an extension on the U-base 172 of the adapter 166 that is fabricated of an elastic plastic. Situated on its upper tongue surface facing the U-base 172 is a tooth-like overhang 190 extending transverse to the longitudinal extension of the wiper arm 110 and on which a locking shoulder 192 aligned in a vertical plane on the supporting element is embodied, which shoulder points away from the free end 148 of the wiper arm 110.

Figure 10:
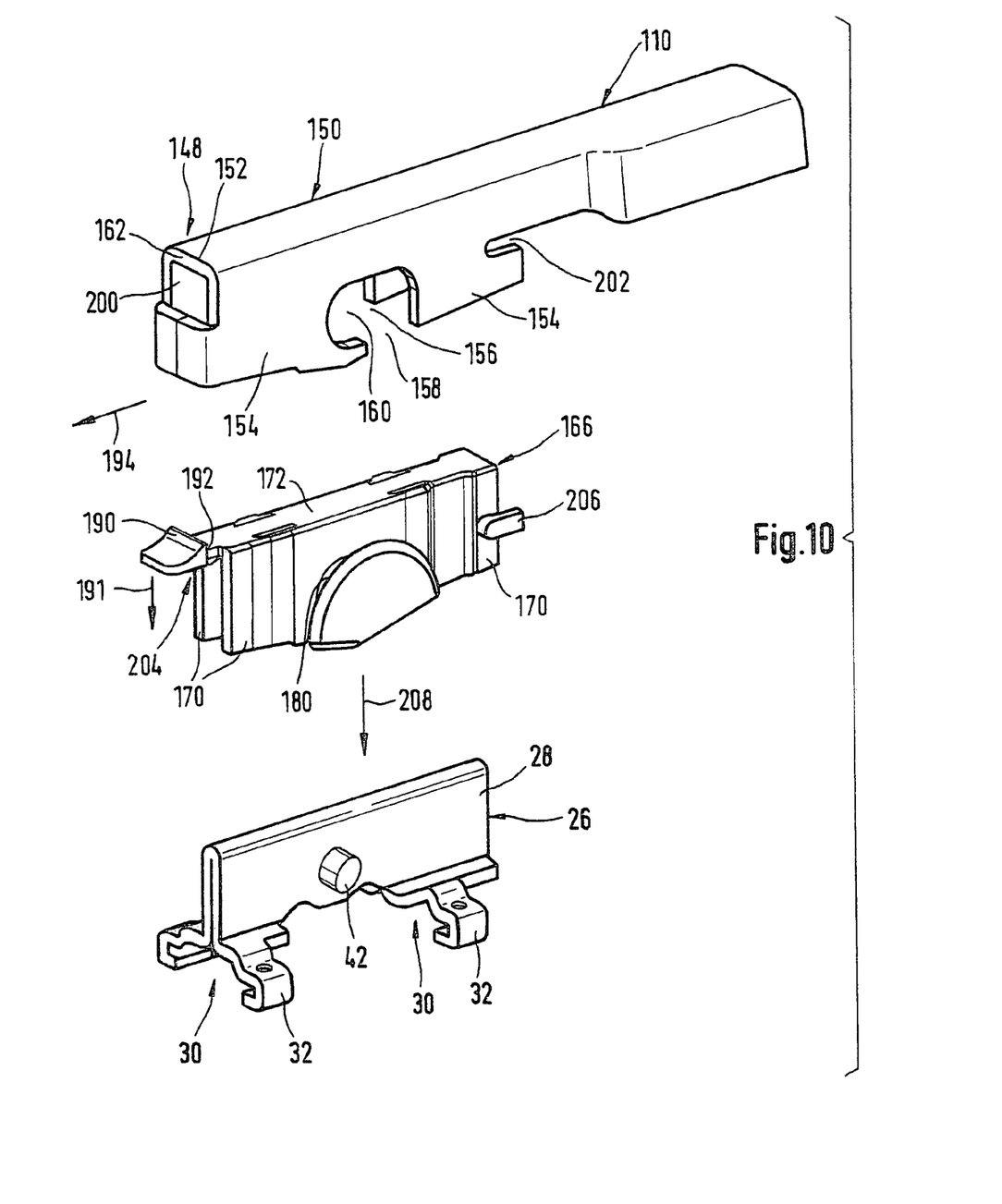
FIG. 10—Another embodiment of an articulated connection in accordance with the invention in an arrangement according to FIG. 4.
Figure 11:
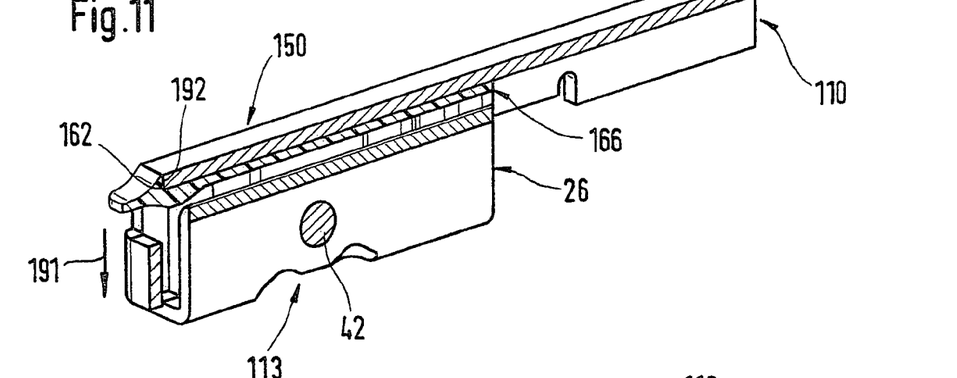
FIG. 11—A longitudinal section according to FIG. 7 through the arrangement according to FIG. 10.
Figure 12:
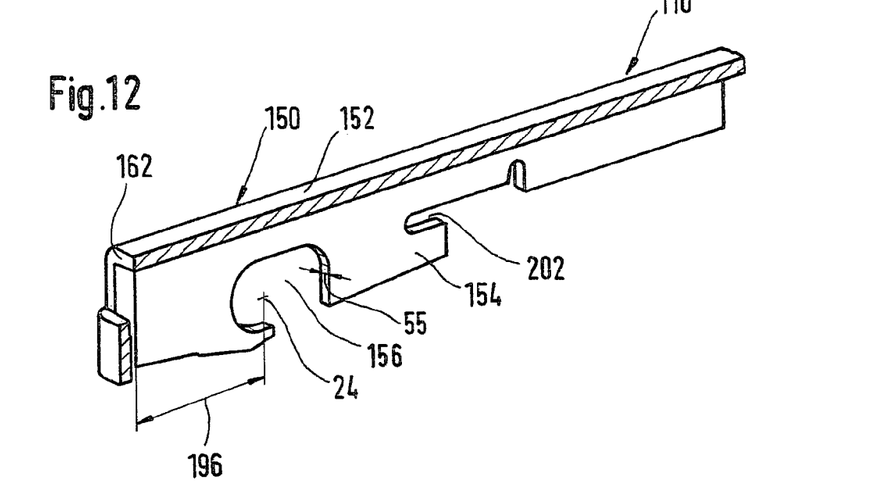
FIG. 12—A longitudinal according to FIG. 8 through the wiper blade holder according to FIG. 11 and FIG. 13—A longitudinal section according to FIG. 9 through the adapter according to FIG. 10.
Figure 13:
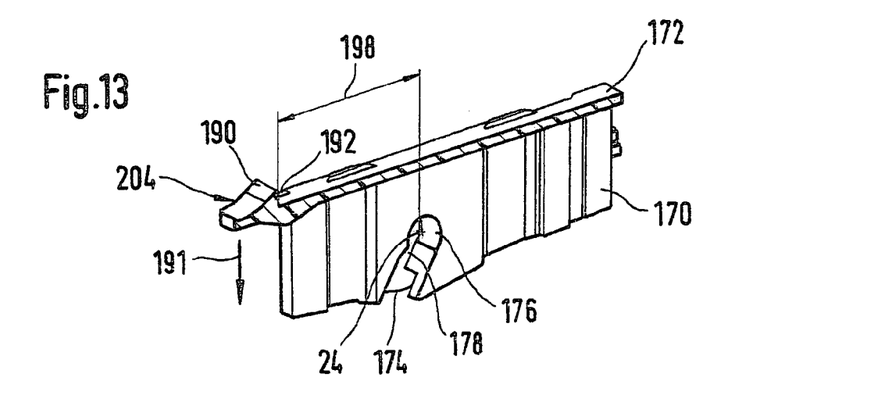

In addition, the adapter is provided with strip-like overhangs 206 on its two U-legs 170, which are assigned to the slots 202 in the U-legs 154 and are arranged on the outer surfaces of the U-legs 170 that are facing away from one another.

To assemble the wiper blade on the wiper arm, one proceeds as follows: First, the adapter 166 is placed on the connecting element 26 (which corresponds to the connecting element already described) in the direction of arrow 208 in the manner already described. In this process, the T-foot 28 of the structural element 26 reaches between the U-legs 170 of the adapter 166 and the pin-like articulated bolts 42 enter the slot-like recesses 174 in the U-legs 170 (FIG. 13) until they reach their rest receptacles 176 via the narrowings 178. In this position, the adapter 166 is now held captively on the wiper blade 12 by the action of the elastically expandable narrowings 178, of which only the connecting element 26 is depicted in FIG. 10, however. Here, just like with the first embodiment already described, coordination between the adapter 166 and the connecting element 26 is accomplished in such a way that the adapter can oscillate vis-à-vis the connecting element 26 around the articulated axis 24 formed by the articulated bolts 42 in the direction of the double arrow 14 in FIG. 1. The adapter 166 now belongs to the wiper blade, which can now be detachably connected to the wiper arm 110 or its wiper blade holder 150. To do so, the wiper blade is joined with the wiper blade holder 150 in the manner already described so that the collar-like projections 180 reach into the L-shaped recess 156. When the intermediate position already described is achieved with this assembly step, the wiper blade is pulled in the direction of arrow 194 (FIG. 10) until the collar-like projections 180 hit the end edge of the other L-leg 160. In this position, the tongue, which was elastically deflected via the U-base 152 in the direction of arrow 108 during placement of the adapter 166 in the wiper blade holder 150 in the direction of arrow 191, exits from the opening 200 of the wiper blade holder 150 and springs back against arrow direction 191 into its initial position, whereby the locking shoulder 192 of the overhang 190 cooperates with the forepart 162 of the wiper blade holder 150 without any play. It is also important with this embodiment that the distance 196 from the articulated axis 24 to the forepart 162 of the wiper blade holder 150 be coordinated exactly with the distance 198 of the articulated axis 24 to the locking shoulder 192 of the overhang 190 of the adapter 166. During the assembly movement in the direction of the arrow 194, the strip-like overhangs 206 of the adapter 166 then also simultaneously enter their assigned slot-like recesses 202 in the legs 154 of the wiper blade holder 150 and thereby secure the adapter 166 from an undesired pendulum motion in the wiper blade holder 150 around the articulated axis 24.

Disassembling the wiper blade from the wiper arm takes place in the manner already indicated after the tongue 204 has been deflected far enough in the direction of arrow 191 (FIG. 11) for the forepart 162 of the wiper blade holder 150 that serves as a stop shoulder to be released.

Common to both exemplary embodiments is that an adapter 66 or 166 is positioned on the two pin-like articulated bolts 42 that can move in a pendulum fashion around their longitudinal axes 24, and this adapter features means to connect to the wiper blade holder 50 or 150 of the wiper arm 10. The required pendulum motion between the wiper arm and the wiper blade occurs therefore between the adapter 26 locked with the wiper arm and the connecting element 66.

The invention claimed is:

1. Device detachably connecting a wiper blade (12), to clean windows, to a driven wiper arm (10) featuring a wiper blade holder (50 or 150) and the wiper blade that can be placed on a window (20) with an elongated, rubber elastic wiper strip (18), the wiper blade featuring a band-like, elongated elastic supporting element (16) that is curved in a longitudinal direction over band surfaces (15, 17), on a lower, concave band surface (17), the wiper strip (18) is arranged parallel to a longitudinal axis and, on an outer, convex band surface, a connecting element (26) sits, the connecting element (26) featuring two parallel wall surfaces (36) generally parallel to a plane generally perpendicular to the band surface and extending in the longitudinal direction of the wiper blade, whereby a pivot pin (42) projects from each wall surface and whereby longitudinal axes of the pivot pins are aligned, characterized in that an adapter (66 or 166) is positioned on the pivot pins (42) of the connecting element (26) to move in a pendulum fashion, and said adapter features means to connect to the wiper blade holder (50 or 150) of the wiper arm (10), characterized in that the two wall surfaces (36) are formed by outside surfaces on a T-foot (28) of the connecting element (26), the connecting element (26) having a T-shaped cross-section, at least in sections, and a T-head (30) facing the supporting element (16) and connected to the supporting element (16), characterized in that the adapter (66 or 166) essentially has a U-shaped cross-section including U-legs (70 or 170) to grip over the T-foot (28) of the connecting element (26) laterally, and a U-base (72) to cover the T-foot (28) of the connecting element (26), in each of the U-legs (70), an open-edge, slot-like recess is arranged towards a free end, the slot-like recesses having slot ends forming rest receptacles (76 or 176) for the pivot pins (42), characterized in that the adapter (66 or 166) is provided with collar-like projections (80) surrounding the rest receptacles (76 or 176) on outer surfaces of the U-legs (70 or 170), and characterized in that the wiper blade holder (50 or 150) of the wiper arm (10) grips over the adapter on its U-legs with side cheeks so that it fits and that open-edge recesses (56 or 156) are arranged in the side cheeks (54) for the collar-like projections (80) of the adapter.

2. Device according to claim 1, characterized in that a distance (38) between the two wall surfaces (36) is smaller than a width (46) of the supporting element (16).

3. Device according to claim 1, characterized in that the connecting element (26) is provided with claw-like extensions (32) on longitudinal edges of the T-head (30) facing away from each other, the claw-like extensions gripping around associated outer longitudinal edges of the supporting element (16).

4. Device according to claim 1, characterized in that the connecting element (26), in cross-section, has two essentially rectangular halves forming the T-foot with an adjacent angle leg and having other angle legs together forming the T-head (30).

5. Device according to claim 4, characterized in that the two halves on the T-foot (28) are connected as a single piece.

6. Device according to claim 1, characterized in that the connecting element (26) is fabricated of a plastic.

7. Device according to claim 1, characterized in that the adapter (66 or 166) is fabricated of an elastic plastic and that the slot-like recesses have elastically expandable narrowings (78) limiting the rest receptacles.

8. Device according to claim 1, characterized in that the recesses in the side cheeks of the wiper blade holder (50 or 150) feature an L-shaped form, whereby one L-leg has an open edge towards the supporting element of the wiper blade and another L-leg (60) extends towards a free end of the wiper arm and a width (57) of the recesses (56) is coordinated with an outside diameter (82) of the collar-like projections (80) of the adapter.

9. Device according to claim 8, characterized in that the adapter (66, 166) is provided with a tongue (88, 204) that is elastically deflectable against a restoring force, and on which a locking shoulder is embodied, the locking shoulder being aligned transverse to the wiper blade and in a vertical plane, that the locking shoulder is associated with a wiper-arm-mounted counter locking shoulder and cooperates with the counter locking shoulder when the collar-shaped projections of the adapter are adjacent to a closed end of the other L-legs of the recesses in the side cheeks of the wiper blade holder.

10. Device according to claim 9, characterized in that the tongue (88) is connected with at least one U-leg (70) of the adapter (66) on a side facing a drive side of the wiper arm, that the locking shoulder projects on a side of the tongue facing away from the wiper blade, and said locking shoulder is associated with a wiper-arm-mounted counter locking shoulder (62).

11. Device according to claim 9, characterized in that the tongue (204) is arranged on the U-base (72) of the adapter (166) and extends towards a free end of the wiper arm, that the counter locking shoulder (162) is embodied on a front side of the wiper arm (10) and that the locking shoulder on the tongue (204) projects over the free end of the wiper arm.

12. Device according to claim 11, characterized in that the adapter is provided with a lateral overhang (206) at least on one U-leg at a distance from the collar-like projections (80), and said overhang is associated with a recess provided on the side cheeks of the wiper blade holder.

13. Device detachably connecting a wiper blade (12), to clean windows, to a driven wiper arm (10) featuring a wiper blade holder (50 or 150) and the wiper blade that can be placed on a window (20) with an elongated, rubber elastic wiper strip (18), the wiper blade featuring a band-like, elongated elastic supporting element (16) that is curved in a longitudinal direction over band surfaces (15, 17), on a lower, concave band surface (17), the wiper strip (18) is arranged parallel to a longitudinal axis and, on an outer, convex band surface, a connecting element (26) sits, the connecting element (26) featuring two parallel wall surfaces (36) generally parallel to a plane generally perpendicular to the band surface and extending in the longitudinal direction of the wiper blade, whereby a pivot pin (42) projects from each wall surface and whereby longitudinal axes of the pivot pins are aligned, characterized in that an adapter (66 or 166) is positioned on the pivot pins (42) of the connecting element (26) to move in a pendulum fashion, and said adapter features means to connect to the wiper blade holder (50 or 150) of the wiper arm (10), characterized in that the two wall surfaces (36) are formed by outside surfaces on a T-foot (28) of the connecting element (26), the connecting element (26) having a T-shaped cross-section, at least in sections, and a T-head (30) facing the supporting element (16) and connected to the supporting element (16), characterized in that the adapter (66 or 166) essentially has a U-shaped cross-section including U-legs (70 or 170) to grip over the T-foot (28) of the connecting element (26) laterally, and a U-base (72) to cover the T-foot (28) of the connecting element (26), in each of the U-legs (70), an open-edge, slot-like recess is arranged towards a free end, the slot-like recesses having slot ends forming rest receptacles (76 or 176) for the pivot pins (42), characterized in that the adapter (66 or 166) is provided with collar-like projections (80) surrounding the rest receptacles (76 or 176) on outer surfaces of the U-legs (70 or 170), and characterized in that shield-like coverings (84) projecting laterally over the projections are arranged on the collar-like projections (80) at a distance from the U-legs of the adapter.

14. Device according to claim 13, characterized in that a distance (38) between the two wall surfaces (36) is smaller than a width (46) of the supporting element (16).

15. Device according to claim 13, characterized in that the connecting element (26) is provided with claw-like extensions (32) on longitudinal edges of the T-head (30) facing away from each other, the claw-like extensions gripping around associated outer longitudinal edges of the supporting element (16).

16. Device according to claim 13, characterized in that the connecting element (26), in cross-section, has two essentially rectangular halves forming the T-foot with an adjacent angle leg and having other angle legs together forming the T-head (30).

17. Device according to claim 16, characterized in that the two halves on the T-foot (28) are connected as a single piece.

18. Device according to claim 13, characterized in that the connecting element (26) is fabricated of a plastic.

19. Wiper arm assembly for use in a wiper device to detachably connect a wiper arm (10) featuring a wiper blade holder (50 or 150) to a wiper blade (12), to clean windows, the wiper blade (12), that can be placed on a window (20) with an elongated, rubber elastic wiper strip (18), featuring a band-like, elongated elastic supporting element (16) that is curved in a longitudinal direction over band surfaces (15, 17), on a lower, concave band surface (17), the wiper strip (18) is arranged parallel to a longitudinal axis and, on an outer, convex band surface a connecting element (26) sits, the connecting element (26) featuring two parallel wall surfaces (36) generally parallel to a plane generally perpendicular to the band surface and extend in the longitudinal direction of the wiper blade, whereby a pivot pin (42) projects from each wall surface and whereby longitudinal axes of the pivot pins are aligned, characterized in that the assembly includes the wiper blade holder (50 or 150) and an adapter (66 or 166) positionable on the pivot pins (42) of the connecting element (26) to move in a pendulum fashion, said adapter featuring means to connect to the wiper blade holder (50 or 150) of the wiper arm (10), the means to connect including the wiper blade holder (50 or 150) of the wiper arm (10) gripping over the adapter (66) with side cheeks having open-edge recesses (56 or 156) arranged in the side cheeks (54) for collar-like projections (80) of the adapter, the recesses in the side cheeks of the wiper blade holder (50 or 150) featuring an L-shaped form, whereby, when connected to the wiper blade (12), one L-leg has an open edge towards the supporting element of the wiper blade and another L-leg (60) extends towards a free end of the wiper arm and a width (57) of the recesses (56) is coordinated with an outside diameter (82) of the collar-like projections (80) of the adapter, and the adapter (66, 166) being provided with a tongue (88, 204) that is elastically deflectable against a restoring force and on which a locking shoulder is embodied, the locking shoulder being aligned transverse to the wiper blade and in a vertical plane, the locking shoulder being associated with a wiper-arm-mounted counter locking shoulder and being configured to cooperate with the counter locking shoulder when the collar-shaped projections of the adapter are adjacent to a closed end of the other L-legs of the recesses in the side cheeks of the wiper blade holder.

* * * * *

UNITED STATES PATENT AND TRADEMARK OFFICE
CERTIFICATE OF CORRECTION

| | |
|---|---|
| PATENT NO. | : 7,607,194 B2 |
| APPLICATION NO. | : 10/250389 |
| DATED | : October 27, 2009 |
| INVENTOR(S) | : Weber et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1478 days.

Signed and Sealed this

Twelfth Day of October, 2010

David J. Kappos
*Director of the United States Patent and Trademark Office*